Aug. 8, 1939.                C. E. PERKINS                2,168,578
              HYDRAULIC SHOCK ABSORBER CONTROL FOR RAILWAY CARS
                            Filed Feb. 26, 1938
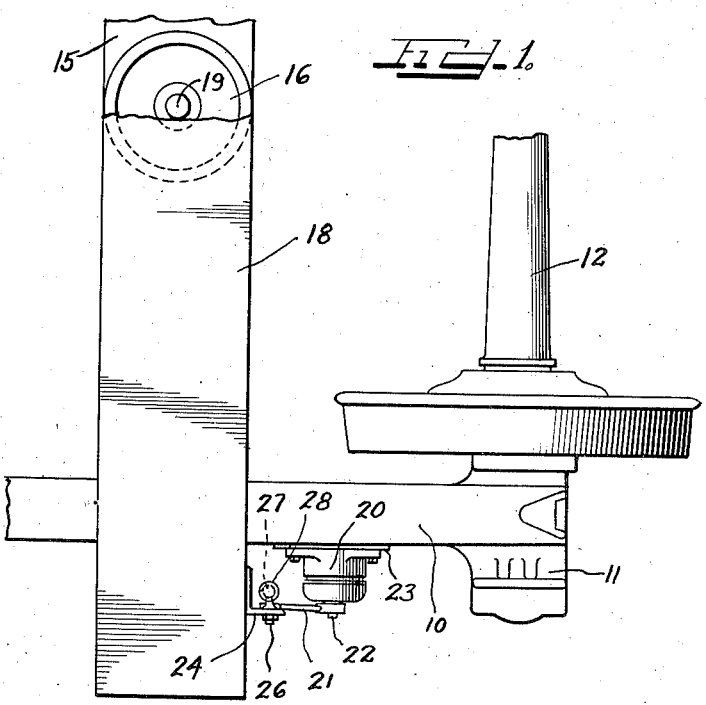
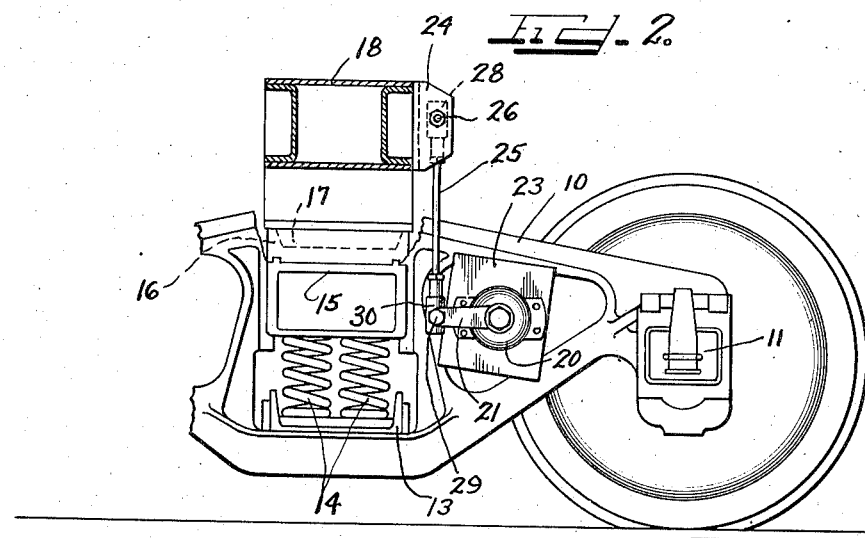
Inventor
CHARLES E. PERKINS.
by Charles Hill Attys.

Patented Aug. 8, 1939

2,168,578

UNITED STATES PATENT OFFICE 2,168,578

HYDRAULIC SHOCK ABSORBER CONTROL FOR RAILWAY CARS

Charles E. Perkins, Buffalo, N. Y., assignor to Houde Engineering Corporation, Buffalo, N. Y., a corporation of New York Application February 26, 1938, Serial No. 192,728

2 Claims. (Cl. 105—199)

My invention relates to hydraulic shock absorber control for railway cars, particularly for controlling the relative movement between the car body structure and the supporting trucks therefor.

In the operation of railway cars, particularly at higher speeds, the cars tend to oscillate or bounce vertically when the trucks travel over track imperfections or track special work, and the cars also tend to roll or rock laterally due to track imperfections or when the trucks travel around curves.

The important feature of the invention resides in such application of hydraulic shock absorbers relative to the car trucks and the car body structure that the shock absorbers efficiently function to dampen and control the vertical oscillation and also the rolling or rocking movement of the car body structure. In accordance with my invention, I connect the shock absorbers between the truck frame and the car body bolster which rests on the truck bolster which is supported or floated by suitable springs mounted on the truck frame.

My improved arrangement is shown on the drawing, in which drawing:

Figure 1 is a plan view of part of a truck, with the truck bolster and the car body supporting bolster partially shown; and Figure 2 is a side elevation of the structure shown in Figure 1.

I have shown a well known type of railway truck comprising the truck side frames 10 supporting at their ends journal boxes 11 for the wheel axles 12. The bottoms of the opposite side frames of a truck carry a beam 13 on which suitable springs 14 within the truck frame are mounted for suspending the truck bolster 15. At its center, the truck bolster has the bearing cup or plate 16 for receiving the bearing lug 17 depending from the bolster 18 which forms part of the supporting framework or chassis for the car body, the bolsters being pivoted together by the usual king bolt 19.

The shock absorbers shown are of the well known hydraulic rotary type comprising the body or cylinder structure 20 with piston structure rotatable therein, and with a lever 21 secured to and extending from the outer end of the piston structure shaft 22. Suitable supports 23 for the shock absorber bodies are provided. As shown, the support may be in the form of a plate preferably welded to the side frame, or the support may be a web or boss preferably formed integral with the side frame. A shock absorber is mounted on each of the side frames of a truck and preferably on the outer side of the frame, the shock absorber bodies being bolted or otherwise rigidly secured to the respective support 23 with their levers 21 extending inwardly. At each end of the car body bolster 18 a suitable bracket 24 is provided for supporting the upper end of a link 25 extending upwardly from the lever of the respective shock absorber. The link has preferably a universal joint or pivotal connection with the shock absorber lever and the corresponding bracket. As shown, the bracket may support a stud 26 terminating in a ball head 27 for receiving the socket fitting 28 at the upper end of the link, while the lever 21 may support a similar stud 29 whose ball head engages in the socket fitting 30 at the lower end of the link. The shock absorbers are preferably located so that the links 25 will normally be substantially vertical.

The weight of the car body, of which the bolster structure 18 forms a part, is yieldably supported by the springs 14 on the truck frame. As the car travels rapidly over uneven or defective trackage, the car body may tend to oscillate or bounce vertically, and the body may tend to roll or rock sideways when the trucks travel over curves or uneven tracks. With hydraulic shock absorbers applied as shown and described, such vertical and lateral movements of the car body relative to the trucks will be efficiently dampened and controlled.

The hydraulic fluid flow controlling means within the shock absorber body may be designed for the particular service desired. For example, valving structure such as is disclosed in Peo Patent No. 2,096,468 of October 19, 1937, may efficiently and effectively be used. With valving arrangement as disclosed in this patent, relative hydraulic resistance to downward movement and upward movement of the car body supporting bolster may be accurately predetermined, so that the downward movement of the car body bolster for compression of the springs 14 will be less resisted by the shock absorber than the upward movement of the bolster by the recoil of the springs. During rocking or rolling of the car body and its bolster, the downward swinging end of the bolster will be resisted by the corresponding shock absorber, but the upwardly swinging end will be resisted to a greater degree by the corresponding shock absorber. The blow-off operation of the low pressure and high pressure valves in the valving arrangement of the Peo patent referred to, when used on the truck shock absorbers, would effectively momentarily relieve the shock absorbers of excess pressure flow so that the vertical oscillation or rocking of the car body would not be too suddenly and severely checked.

Shock absorbers of the type disclosed in the Fox Ullery Patent 2,004,752, June 11, 1935, may also be advantageously used as in shock absorbers of this type the shock absorbing and dampening action is independent of any changes in the viscosity of the hydraulic fluid employed.

The universal pivot or joint connection of the links 25 with the shock absorber levers and the car body bolster brackets will permit relative lateral displacement between the car body and truck and rotational displacement of the truck relative to the car body without straining the shock absorbers, such relative movement being comparatively slight during running conditions of the car as the links 25 are close to the vertical axes of the truck frames.

It is evident, that instead of one shock absorber on each truck frame, as shown, another shock absorber might be mounted on the other side of the vertical axis of the truck frame for link connection with a bracket on the corresponding side of the car body bolster. Other types of hydraulic shock absorbers, besides those shown, may also be used, the main feature of the invention being the connection of the shock absorbers between the truck frame and the car body frame or bolster structure. With such arrangement the vertical oscillation and the rolling of the car body structure is efficiently hydraulically dampened and smoothed out so that abrupt and disturbing and undesired relative movement between the body structure and the trucks is eliminated.

I am aware that many changes may be made and numerous details of construction may be varied through a wide range without departing from the principles of this invention, and I, therefore do not purpose limiting the patent granted hereon otherwise than necessitated by the prior art.

I claim as follows:

1. In combination, the truck of a railway car comprising side frames and a bolster spring supported on said side frames, a car body to which the bolster is pivoted for lateral turning of the truck, a hydraulic shock absorber comprising a cylinder structure mounted on one of the side frames and a piston structure having an arm extending therefrom and terminating substantially vertically below the adjacent end of the bolster, and a substantially vertical link having universal joint connections with the arm end and with the car body whereby said shock absorber may function to dampen and control vertical oscillation and rolling of the car body during travel of the car.

2. In combination, the truck of a railway car and the car body spring suspended on the truck, a hydraulic shock absorber comprising a cylinder element and a piston structure therein having a shaft terminating in an arm, said shock absorber cylinder element being mounted on one of the journal box supporting side frames of the truck, and a vertical link having a universal joint connection with said arm and the car body, said shock absorber connection between the truck frame and car body functioning to dampen and control vertical oscillation and rolling of the car body during travel of the car.

CHARLES E. PERKINS.